Nov. 22, 1932.    R. L. GRIFFIN    1,888,591
FASTENING DEVICE
Filed Nov. 20, 1930
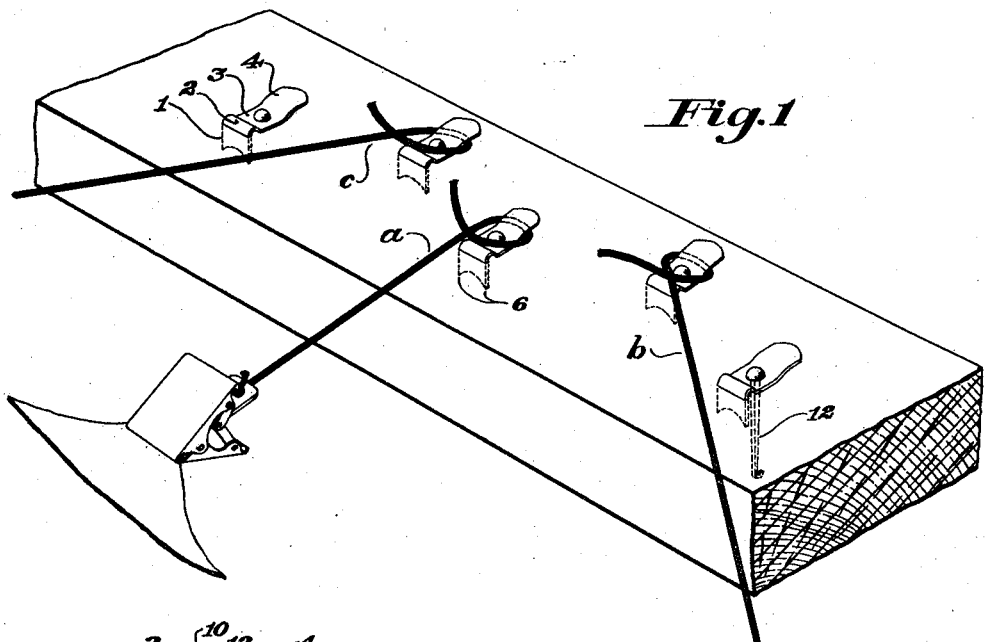
Fig.1
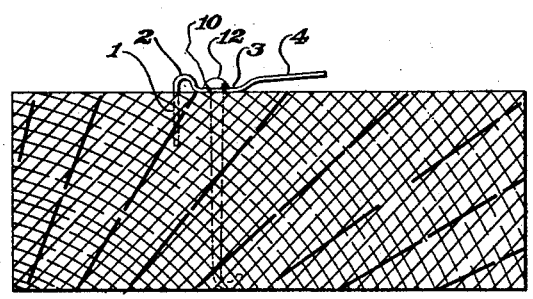
Fig.2
Fig.3
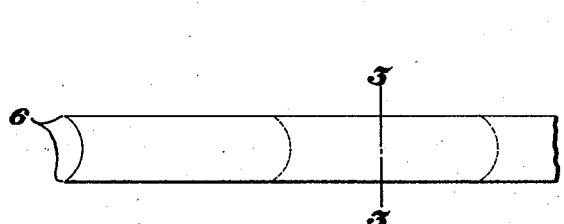
Fig.4
Witness
Paul F. Bryant
Inventor
Roger L. Griffin
by his attorneys
Van Everen, Fish, Hildreth & Cary Patented Nov. 22, 1932

1,888,591

UNITED STATES PATENT OFFICE

ROGER L. GRIFFIN, OF PEABODY, MASSACHUSETTS, ASSIGNOR TO A. C. LAWRENCE LEATHER COMPANY, OF PEABODY, MASSACHUSETTS, A CORPORATION OF MAINE

FASTENING DEVICE

Application filed November 20, 1930. Serial No. 496,974.

The present invention relates to fastening devices and more particularly to fastening devices forming parts of stretching frames designed especially for the stretching of leather hides and skins.

According to the present practice, leather hides and skins are stretched upon expansible stretching frames to which they are attached by means of clamps or toggles, as they are called, which grip the material to be stretched at its edges, and have attached thereto each a stout cord which is drawn tight by the operator and then secured in such condition to one of the fastening devices or cleats of the stretching frames. Since each hide or skin is irregular in shape and varies in thickness and stretchability, its various parts must be subjected to tensions differing in amount and direction, so that the toggle cords vary in tightness and extend at different angles with the expansible stretching frame to which they are fastened. Not only is it essential that the fastening devices or cleats be capable of engaging and holding positively the toggle cords under strong tension exerted at various angles, but undue wearing or fraying of the cords must be avoided. Furthermore, the fastening devices must be capable of permitting the toggle ends to be attached thereto and detached therefrom with ease and facility. Finally, the fastening devices must be simple in construction, cheap to manufacture and readily and securely attachable to the expansible stretching frames.

It is the object of the present invention to provide a fastening device or cleat which shall be particularly adapted for use on stretching frames and which shall satisfy the foregoing requirements.

To the above end the present invention consists in the device herein described and claimed.

The invention in its preferred form is illustrated in the accompanying drawing in which Fig. 1 is a view in perspective of a portion of one of the members of a stretching frame with five cleats disposed in staggered arrangement thereupon, showing toggle cords under tension at various angles; Fig. 2 is an end view of the member and cleat showing the mode of attachment of the cleat; Fig. 3 is a transverse section on the line 3—3 of Fig. 4; and Fig. 4 is a plan view of the strip material from which the cleats are formed, showing the manner of cutting the cleat blanks therefrom.

The device illustrated in the drawing comprises briefly a fastening device or cleat which is adapted to be attached to the stretching frame or other support partly by being driven therein and partly by means of a nail passing through an opening in the body of the cleat and into the support and clinched therein. The cleat shown in Fig. 2 consists of portions as numbered, of which 1 is the nail portion, 2 is the transverse rib, 3 is the body portion and 4 is the cord-engaging portion.

The nail portion 1 is a flat, bladelike portion of the cleat provided at one end with two prongs 6 formed by cutting the thin flat metal strip along a concave arc as shown in Fig. 4. The opposite end of the nail portion is bent over to form the rounded transverse rib 2, which serves primarily as an abutment for arresting and holding the cord in a manner later to be described, and secondly, as a means of strengthening the cleat in the transverse direction.

Extending from the rib and at substantially right angles to the nail portion is the flat body portion 3 provided with an opening 10 through which the clinching nail 12 is driven and clinched in the member of the stretching frame or other cleat support. The flat cord-engaging portion 4 extends at an oblique angle to the body portion and has a rounded end complementary to the pronged end of the nail portion as shown in Fig. 4, to facilitate the passing of the cord beneath and to avoid sharp corners with the liability of chafing and fraying of the same.

The method of affixing the cleat to its support and of using it thereafter is as follows: The nail portion of the cleat is driven into its support by blows upon the transverse rib 2, until the under surface of the body portion 3 is substantially flush with the surface of the cleat support. A nail, preferably with smooth rounded head is then driven through the opening in the body portion, into the cleat support and clinched therein, thus securing the cleat permanently in position.

In order to avoid liability of splitting the wooden members of the stretching frame, as would be the case if the pronged ends of the cleats were all driven into such member along a single line and the attaching nails were also in line, the cleats are positioned as shown, being staggered. This arrangement also affords more room for the operator in fastening and releasing the cord.

In use, the toggle with its attached cord is fastened to the edge of the hide or skin and the toggle cord drawn by the operator in the direction and to the extent to give the desired stretch to the material. The free end of the cord is then quickly passed around and under the cord-engaging portion of the cleat and then under the cord as it extends from the frame to the toggle, being then pulled back to bring the cord over and behind the rib so that it lies across the body portion 3 of the cleat as shown in Fig. 1.

Whether the cord leads at right angles to the frame as shown at $a$, or obliquely to the right as indicated at $b$, or to the left as at $c$, the rib 2 prevents dislodgment of the under cord while the pressure of the cord above is sufficient to prevent slipping. Thus the cord is securely held at whatever its angle or tension. The release of the cord is quickly accomplished by reversing the steps of the above procedure.

Not only are the above described cleats easily attached to the frame or support and operate in an efficient and simple manner, but they can be manufactured with facility and at a minimum of cost. Flat strips of metal with rounded edges as shown in Figs. 3 and 4, can be cut into blanks along the arcs shown in dotted lines with no wastage, and then can be punched and pressed into shape between suitable dies.

Having thus described the invention, what is claimed is:

1. A cleat comprising a flat body portion to engage a support to which the cleat is attached, a nail portion extending across the end of the body portion and provided with a pronged extremity, the nail portion with its pronged extremity being adapted to be driven into the support, and a cord-engaging portion disposed to the body portion at an oblique angle to permit the wedging of a cord between it and the cleat support.

2. A cleat comprising a body portion, a nail portion at right angles thereto and separated therefrom by a transverse rounded rib, and a cord-engaging portion disposed to the body portion at an oblique angle to permit the wedging of a cord between it and the support to which the cleat is attached.

3. A cleat comprising a body portion, a nail portion disposed at right angles to the body portion and provided with a pronged extremity, and a cord-engaging portion disposed at an oblique angle to the body portion and provided with a rounded end in form complementary to the pronged extremity of the nail portion.

4. A cleat comprising a flat middle body portion provided with an opening to receive a fastening device, a flat cord-engaging portion disposed at an oblique angle to the body portion and provided with a rounded convex end, a flat nail portion disposed at right angles to the middle body portion and provided with a rounded concave end complementary to the end of the cord-engaging portion to form driving prongs, and a rounded transverse rib uniting the flat middle body portion and the nail portion and serving as a cord abutment.

5. A cleat stamped from a flat metal strip comprising a middle body portion provided with an opening to receive a fastening device, a nail portion angularly disposed to the body portion and adapted to be embedded in the support to which the cleat is attached, a rounded transverse rib between the body and nail portion, and a cord-engaging portion obliquely disposed to the body portion, the extremity of the cord-engaging portion being convexly curved and the extremity of the nail portion being concavely curved and complementary thereto.

6. A cleat formed of a metal strip of uniform width throughout having a flat middle portion to engage the support to which the cleat is attached, one end portion of the strip being bent downwardly at right angles to form a nail portion and adapted to be driven into the support, and the other end portion of the strip being bent upwardly at an oblique angle to form a cord engaging portion to permit the wedging of a cord between it and the support.

7. A cleat comprising a flat body portion, a nail portion comprising a long shank with a pronged extremity, the shank being adapted to be driven bodily into the support to attach the cleat securely thereto, and a cord-engaging portion arranged to permit the wedging of a cord between it and the cleat support.

In testimony whereof I have signed my name to this specification.

ROGER L. GRIFFIN.